UNITED STATES PATENT OFFICE.

ALADÁR PACZ, OF CLEVELAND, OHIO, ASSIGNOR, BY MESNE ASSIGNMENTS, TO GENERAL ELECTRIC COMPANY, A CORPORATION OF NEW YORK.

MANUFACTURE OF INCANDESCENT BODIES OF TUNGSTEN.

1,071,568. Specification of Letters Patent. Patented Aug. 26, 1913.

No Drawing. Application filed June 12, 1908. Serial No. 438,064.

*To all whom it may concern:*

Be it known that I, ALADÁR PACZ, a subject of the King of Hungary, residing at Cleveland, in the county of Cuyahoga and State of Ohio, have invented a certain new and useful Improvement in the Manufacture of Incandescent Bodies of Tungsten, of which the following is a full, clear, and exact description.

My invention relates to the manufacture of incandescent filaments, rods, or the like, especially metallic filaments capable of withstanding the high temperatures to which they must be subjected in the production of light in incandescent electric lamps. By the employment of my invention, strong elastic wires or filaments of such refractory metals as tungsten that are fine and smooth and of uniform cross-section throughout can be obtained readily and cheaply.

The difficulties attendant upon the production of filaments of the above mentioned metals are sufficiently well known in the art to obviate the necessity of here enumerating the reasons for the trouble hitherto had in obtaining fine, smooth wires of sufficient homogeneity to produce the best results.

I have discovered that the objects of my invention may be obtained by following a procedure in which use is made of pasty and plastic masses of the precipitated gels of colloidal organic compounds of such metals as tungsten and molybdenum.

My method of obtaining these compounds may be here briefly described as involving the bringing together of a solution of a compound of the metal, as tungstate of ammonia, with a trioxy-derivative of benzene such as pyrogallol and its isomeric compounds or a trioxymono-carboxyl-derivative of benzene such as gallic acid, its isomers and tannic acids, which reagents may be generically classified as those derivatives of benzene containing three or more hydroxl groups, and adding either simultaneously or subsequently a precipitant such as hydrochloric acid or an alkali. For the purpose of making the precipitate sufficiently plastic I prefer in the case of the metals tungsten and molybdenum to use a mineral acid as a precipitant. The result will be a precipitate in the form of a so-called gel, which I find to be an organic compound of the metal, and from all indications to be in the collodial state. For instance, the details of one method by which I produce a compound of this character are as follows: To 330 cubic centimeters of a solution of gallic acid containing 15 grams per liter I add 128 cubic centimeters of a solution of ammonium tungstate containing 160 grams of $WO_3$ per liter. The solution is then stirred and heated to boiling, and while it is boiling hot, 175 cubic centimeters of a 40 per cent. solution of sulfuric acid is slowly added and the boiling continued for about one-half hour. The resulting precipitate is then removed from the aqueous mixture by filtering under suction, and the compound is thoroughly washed with hot water.

I have given an illustration involving the use of gallic acid because for the purposes of my invention this substance is in some respects unique as regards the ease and certainty with which good results are obtained, as well as in respect of the quality of the filaments and the fineness and uniformity obtainable. While I have indicated one order of procedure which I have practised with success, nevertheless the exact routine to be followed is not material, since the sequence of the steps may be changed after the manner well known to chemists and those skilled in the art. While, also, the proportions above given will indicate a very fair working rule, I attach no special importance to them. Whether my conclusion as to this precipitated gel being in the colloidal state be accepted or not, the fact remains that the gel is a pasty and very plastic organic material comprising the metal, and it is with such a substance obtained in the above described or any other manner, that I proceed to the manufacture of the light emitting bodies desired.

From the obtained gels or from a mixture of them, I remove in any suitable manner as by filtration, suction, pressure or evaporation, so much of their liquid constituent, which is $H_2O$, as may bring them to the required pasty condition. These pasty and plastic organic compounds of the metal or metals in question—plastic because of the liquid remaining associated with them, without any mechanically mixed foreign binding material—are then worked into the desired shape in any suitable manner, say in the case of filaments, by squirting the mass through a die of the proper size. If desired, any of such metals as tungsten, molybdenum, tantalum, titanium, thorium, osmium, and the like, or any mixture of them, or their suitable and highly refractory compounds, can be added to the mass in the ordinary state, but very finely divided. The filaments thus obtained are then dried and they are conductors after simple drying if a first-class conductor has been added to the colloidal or plastic mass in the ordinary state, but if no such addition is made, they will conduct only after they are heated up, in a suitable atmosphere that will not attack the metals. After the filaments become conductive they are heated gradually, by means of the electric current preferably, to a white heat, also in a suitable atmosphere. By this process the organic compound is broken down in some such manner as indicated by the following equation in which the organic compound of tungsten, as it exists in the plastic mass, appears upon the left hand. This formula of the plastic organic compound of tungsten is perhaps not exact, but it is indicative of the character of the compound.

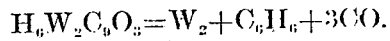

It has been shown that the process can be carried out also in the absence of hydrogen, say in a vacuum, but this is of no importance, being more costly and less rational. I do not base anything on the formula given, it indicates merely that I have sufficient tungsten to make filaments and also that the plastic material yields the metal when heated under the conditions set forth. Indeed, even if the plastic material be not an organic compound of tungsten but a composite substance comprising the tungsten and the organic matter in different chemical combinations (this being the opinion regarding my product expressed by some persons), the characteristics of the material arising from the reaction in which the ammonium tungstate and the gallic acid are undoubtedly involved and the special fitness and advantages of the material for filament manufacture would in no wise be altered, since they depend on its behavior and not upon the correctness of any theory regarding its chemical constitution.

By the use of the plastic organic compounds described, a shrinkage in length and transverse section of 75 per cent. of the size of the die can be obtained so that the manufacture of filaments with 0.0125 mm. diameter will not involve very great difficulties. By the addition of more or less of metals or suitable highly refractory compounds in the ordinary state to the colloidal mass, this shrinkage can be regulated. The mass can be brought into the desired shape with the greatest ease, making possible the use of low pressure and inexpensive dies. The raw filaments can be made conductive by firing at a low temperature in hydrogen, and are strong enough to be handled throughout the whole process. Though they have an enormous shrinkage during the drying and forming, they are regular in such shrinkage and are smooth.

My process obviously lends itself to the production of filaments consisting of pure metals, alloys and metallic compounds of metals (such as silicides, borids, zirconides, etc.) or filaments consisting of a first-class conductor (pure metals) and second-class conductors (such as $ZrO_2$, $ThO_2$, etc.)

When a finely divided metal in the ordinary state is used with the plastic mass, the first heating of the raw filaments to render them conductive may be considerably diminished.

I claim as new and desire to secure by Letters Patent of the United States:

1. A plastic material for the formation of raw filaments in tungsten filament manufacture comprising a reaction product of a soluble salt of tungsten with a trioxy derivative of benzene containing three or more hydroxyl groups.

2. A plastic material for the formation of raw bodies in the manufacture of incandescent bodies of tungsten comprising the product obtained by bringing together a soluble salt of tungsten and gallic acid along with mineral acid.

3. A plastic material for the formation of raw filaments in tungsten filament manufacture comprising the product obtained by bringing together a soluble compound of tungsten and gallic acid along with a precipitant.

4. A plastic material for the formation of raw filaments in tungsten filament manufacture comprising the reaction product of a soluble tungsten compound and an organic substance and owing its plasticity to the association of said reaction product with a suitable amount of liquid.

5. A plastic material for the formation of raw bodies in the manufacture of incandescent bodies comprising the reaction product of a soluble compound of tungsten with gallic acid, mingled with other material finely divided.

In testimony whereof, I hereunto affix my signature in the presence of two witnesses.

ALADÁR PACZ.

Witnesses:
E. B. GILCHRIST,
H. R. SULLIVAN.